Figure 3:
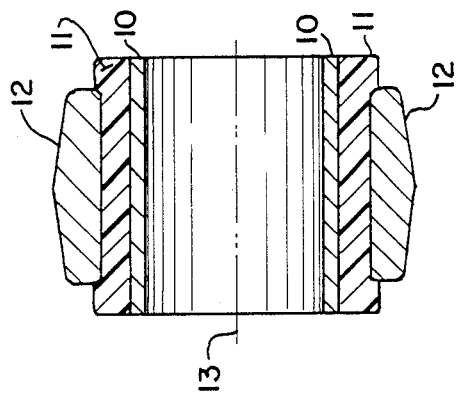

United States Patent [19]

Sturmon

[11] Patent Number: 4,840,395
[45] Date of Patent: Jun. 20, 1989

[54] BUSHING FOR VEHICLE SUSPENSION

[76] Inventor: George Sturmon, P.O. Box 1241, St. Charles, Mo. 63302

[21] Appl. No.: 898,959

[22] Filed: Aug. 21, 1986

[51] Int. Cl.$^4$ .............................................. B60G 11/58
[52] U.S. Cl. ..................................... 280/688; 384/300
[58] Field of Search ...................... 280/96.1, 660, 668, 280/673, 688; 384/297, 299, 300

[56] References Cited

U.S. PATENT DOCUMENTS

| 2,660,449 | 11/1953 | MacPherson | 280/668 |
| 3,047,934 | 8/1962 | Magner, Jr. | 384/299 |
| 4,048,370 | 9/1977 | Orkin et al. | 384/300 |
| 4,145,072 | 3/1979 | Matschinsky | 280/668 |

OTHER PUBLICATIONS

Stoffer, J. et al., "Preliminary Report and Evaluation of Castable Urethane Bushings for the Transportation Industry".
Trudeau, B., "Torque Rods", *Fleet Equipment*, Jul., 1985, pp. 65, 66.
Lyndall, J., "Suspensions Get Lighter, More Stable, Deliver a Better Ride", *Fleet Owner Small Fleet Edition*, Sep., 1986, pp. 71–73.
Harvey, S. R., "Polyurethane Elastomers", American Cyanamid Company, Wayne, N.J., 1973.
"Cyanaprene" Data Sheet D-QM, American Cyanamid Company, Wayne, N.J.
"Thioxon" Technical Bulletin, Whittaker Corporation, West Alexandria, Ohio.

*Primary Examiner*—Charles A. Marmor
*Assistant Examiner*—Ross Weaver
*Attorney, Agent, or Firm*—Porter, Wright, Morris & Arthur

[57] ABSTRACT

A rod for the suspension system of a motor vehicle such as a bus which maintains fixed points of the chassis and frame or body in a fixed point to point alignment in the vehicle suspension system comprising a rod having openings at each end for an interference fit attachment to predetermined points or dowels, in which the openings are defined by a freely rotating bushing that is surrounded by a concentric cast polyurethane interface that is bonded to an inner concentric circular opening surface at the end of the rod. The rod is a replacement for transit bus torque rods.

14 Claims, 1 Drawing Sheet

U.S. Patent  Jun. 20, 1989  4,840,395

BUSHING FOR VEHICLE SUSPENSION

FIELD OF INVENTION

This invention relates to a transit bus, and particularly to a substitute for a torque or radius rod, useful as an improved repair or replacement part as well as an original equipment part.

BACKGROUND OF THE PRIOR ART

The torque rod or radius rod system in a transit bus is a crucial element in the bus suspension system and provides the securing interface between the chassis and the bus body, which are also connected to the axle by the bus shock absorber and leaf spring system. [*Fleet Equipment*, July, 1985, pages 65,66 ] The rod provides a secure connection between the chassis and frame or body and maintains the alignment of fixed points in the two members. In the prior art the torque rod or radius rod is a rod having bushings at two opposite ends. Typically the bushing comprises a split metal ring insert surrounded by a compressed rubber interface enclosed within the integrally cast circumferential end of the rod. The bushing is subjected to continual internal stress because the bushing/rubber/rod assembly is designed to be maintained in fixed relationship. Forces are absorbed into the rubber interface, and the twisting actions are absorbed by the rubber's elastic properties. The rubber interface resists both rotation and conical movement of the ring with respect to the torque rod. Typically, this design provides a rotation of +/−15 degrees and a conical angle of +/−5 degrees. Once the split ring becomes moveable, the ring will rotate and erode the surrounding rubber, eventually rendering the rod ineffective.

Transit buses usually include multiple torque rods, from 6 to 12 per bus, and because the rods are subjected to considerable strees, breakdown is frequent; however, replacement is a difficult and labor intensive job. For example, many garages schedule the replacement of a single torque rod for 4.5 hours of labor which involves the difficult task of installing the rod over a dowel in an interference fit and aligining the two supported points of the rod.

OBJECTS OF THE INVENTION

It is an object of the present invention to provide an improved torque rod that is easy to install and more durable in its use. The present invention provides a rod having a bushing concentrically encircled by a polyurethane elastomer interface in which a precision fit between the bus chassis and body is achieved and saving in labor required for installation or replacement are realized.

Figure 2:
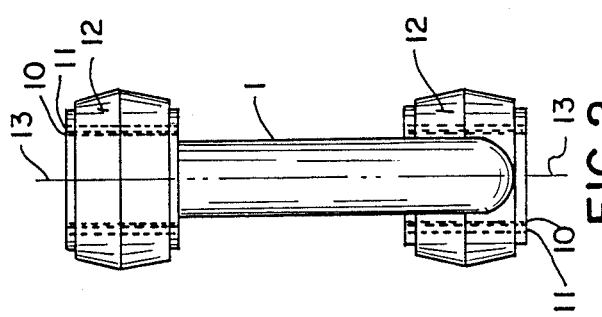
Figure 1:
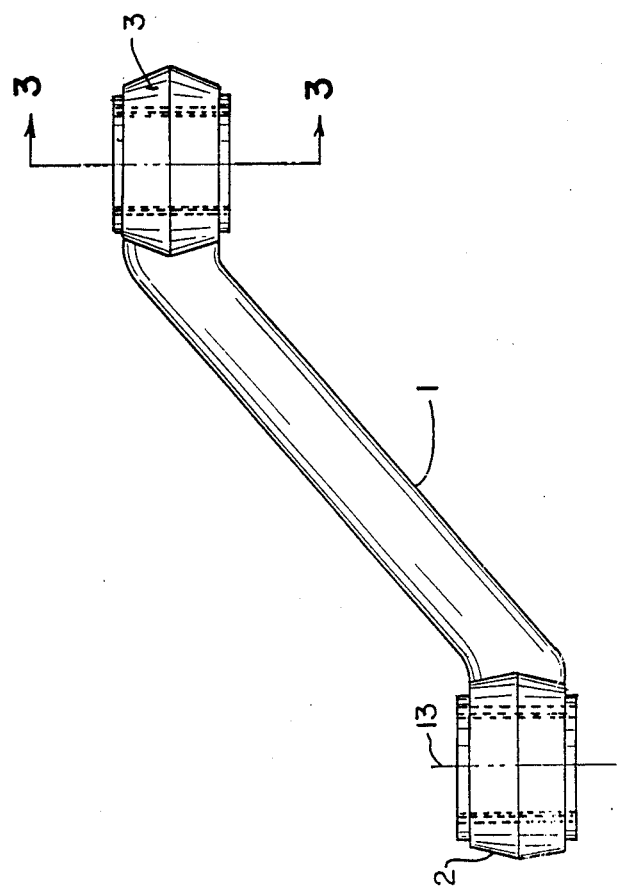

These objects will be more fully appreciated with reference to the following description of the preferred embodiment taken in conjunction with the drawings in which: DESCRIPTION OF THE DRAWINDS FIG. 1 is a side view of a conventional torque rod.
FIG. 2 is a front view of the rod of FIG. 1.
FIG. 3 is a cross sectional view of a representative connecting portion of the torque rod.

DESCRIPTTION OF THE PREFERRED EMBODIMENT

In FIG. 1, an extended torque rod is shown which typically includes an integrally cast rod segment 1 that terminates in bushing segments 2 and 3 at either end that are respectively affixed to the bus chassis anad frame.

Usually the bushing ends are identical. As shown in FIG. 3 the bushing comprises a metal sleeve 10 mantained in place through an interface 11 maintained in the cast rod segment 12.

In the invention, an out-of-round torque rod is reclaimed and an elastomert polyurethane interface is boned to the rod, but permits free rotation of a concentric inner sleeve that is held in an interference fit to a dowel on the axel or frame.

In a representative example, the original bushing and compressed rubber interface are discarded from a used and worn rodd and the inner circumferential surface of the rod is cleansed and abraded by a process such as sand-blasting. A new bushing ring is bored for a slight interference fit (0.0001 to 0.0003 inch) to the bus frame and chassis dowel. The center of the out-of-round torque rod is determined by centerline to centerline measurements in a conventioanl center determination method; and the new bushing ring is concentrically placed therein in the center-line thereof (13 in FIG. 2). The ring and rod are then maintained securely in their precise alignment throughout the succeeding steps in which a polyurethane interface is poured and cast. The relative size of the bearing ring thickness and polymer interface between the bearing asnd torque rod opening are typically predetermined, in accordance with existing engineering design of any particular vehicle and standard motor vehicle engineering practices. As referred to herein, a replacement rod for a full-sized 40', 102" bus is considered. For other type of vehicles, standard engineering practices in the automotive industry will predetermine specific parameters. Typically, however, the polymer interface, radially measured is considerably thicker than the thickness of the bushing ring. For example, if the bushing ring were of a metal 0.125 inch thick, the thickness of the polymer interface would be approximately more than 3 to 5 times greater. Similarly, the means for maintaining a mold for casting polyurethane in any particular rod, i.e. such as to prevent spillage or leakage of the liquid polyurethane resin from the volume intended tobe cast, is evident and takes optional forms depending on the shape of the rod involved and/or technician preference.

Before the interface is cast, however, a bonding agent is applied to the abraded surface of the rod and a parting compound is applied to the outer surface of the bushing ring so that respectively, the polyurethane compounnd 11 becomes bonded to the rod 12 but permits the bushing ring 10 to be freely rotating therein. The polyurethane compund is poured into, and fills the space between the rod and ring; the compound is thereupon allowed to cure.

In the formulation of a typical casting mixture, D-5QM Cyanaprene (American Cyanamid Co.) is a preferred urethane composition and is mixed with a suitable stoichiometric amount of Cyanaset M-Urethane (American Cyanamid Co.E, a curing agent. The bonding agent preferred is Thixon 416 (Whittaker Corporation/Dayton Chemical Division and the parting compound preferred is "Never-Seez"(Bostick Corporation). After an initiial "setting" stage of 1 hour at 212° F., curing takes about 16 hours at a controlled temperature of 212° F. In the curing of the urethane, an elevated temperature will generally produce a harder polyurethane while a cure period of shorter duration or lower temperature will result in a softer composition.

After curing, the rod is then installed on the bus. the full uninterrupted bushing, as opposed to the bus. The full uniterrupted bushing, as opposed to the split bushing used in the prior art, is free to rotate with respect to the hardened urethane interface. In the installation of the rod, one end of the rod is installed and secured relatively immovably in an interference fit in the dowel of the bus, and because the bushing permits free rotation of the rod, the installler may simply holdd the rod and turn it to match the corresponding dowel at the other end. This can be performed in about 45 minutes in contrast to the significant alignment effort required to install or replace a conventional split ring/rubber insert rod. In the rod herein, the unbroken bushing ring is able to move with respect to the polyurethane adjacent the bearing surface. Thus, the rod serves a purpose comparable to the prior art rod of maintaining the frame and chassis a predetermined degree apart and in the predetermined degree of respective alignment; however, the full radial movement permitted by the bushing ring may produce less stress on the components of the bus. For example, when a pothole is struck, the rubber in a prior art split ring rod will be subjected to the stress of impact; however, th efree insert of the rod herein is able to rootate in response to evident stress and permit other components of the bus suspensison system to absorb the shock. Similarly, acceleration and braking of the bus produces a movement and shock load in one lateral direction absorbed by the rod. The only movement of the rod is centerpoint-to-centerpoint resulting in the bus shock absorber and leaf spring suspension system absorbing up and down shock.

As noted above, in the polymer formulation for a typical casting mixture, a Cyanaprene D-5QM polyurethane resin composition is preferred. This composition is an elaslomer having 49-53 Shore D hardness when cured with a Cyanaset M Curative [methylenebis (o-chloroaniline)] [See *Technical Data Sheet, Cyanaprene D-5QM*, American Cyanamid Company, Wayne, N.J.]. Represntative Chemical specifications for the Thixon (TM) adhesive agent for bonding castable urethane compounds to metal are set forth in *Thixon* (TM) *Adhesives Data Sheet*, Dayton Chemicals Division, Whittaker Corporation, West Alexandria, Ohio. This adhesive is a solvent borne bonding agent.

In an evalaution of the poured polyurethane rod in comparison to a prior art rubber sleeve rod, a hardness test measured with a Type A Durometer indicated a hardness of 71 for the rubber rod and a slightly harder measurement of 89 for the cast polyurethane rod. Preferably the durometer of the cast polyurethane should be at least equivalent to that of the compressed rubber in an OEM rubber sleeve torque rod.

While variations of the polyurethane formulation and the specific bonding and release agents employed are possible within limits predetermined by specific applications, such application variations are not intended to be excluded from the following.

I claim as follows:

1. An interface rod connecting the frame, chassis and the body of a motor vehicle with respect to the axel, in conjunction with the spring and shock absorber system in the vehicle suspension system;

said interface rod comprising an extended rod having an opening at each of the opposite ends thereof, each of which openings is adapted to be mounted to a corresponding member at a fixed predetermined location in the vehicle suspension system such that a connection between the center point of the openings at the opposite ends of the rod and the corresponding points of the vehicle suspension system is achieved, wherein the improvement comprises:

an uninterrupted round cylindrical bushing ring forming the opening which is adapted to the interference fit with the corresponding member at the predetermined location in the vehicle suspension system;

said bushing ring being freely rotating with respect to said extended rod and concentrically mounted within a cast polymer interface that is formed within an intrinsic larger hole in the rod;

said cast polymer interface having a nomial hardness in the range of from 71 Type A Durometer to 53 Type D Durometer, said hardness being chosen to allow said polymer to be compressed to absorb shock loads and to permit temporary misalignment of said rod and said corresponding members under stress, said cast polymer interface being further secured in the intrinsic larger hole formed at the end of the rod;

whereby said cast polymer interface is fixed with respect to the intrinsic larger hole in the rod and rotatable with respect to said bushing ring.

2. The rod of claim 1 in which the intrinsic larger holes formed at the end of the rod include an abraded surface on the inner side thereof and an adhesive bonding agent maintains the cast polymer interface fixed with respect to the rod.

3. The rod of claim 1 in which the bushing ring is centered within the intrinsic larger hole formed at the end of the rod and in which the cast polymer interface is formed between the outer surface of the bushing ring and the inner facing side of the large hole formed in the end of the rod and the cast interface is a polyurethane composition that is cast in place while the bushing ring is maintained in a center point. alignment within the large hole in the end of the rod.

4. The rod of claim 3 in which a coating of a releasing agent seoarates the facing surfaces of the bushing ring and the cast polymer interface.

5. An interface rod connecting the frame, chassis and the body of a motor vehicle with respect to the axel, in conjunction with the spring and shock absorber system in the vehicle suspension system;

said interface rod comprising an extended rod having an opening therein mounted to a fixed predetermined position in the vehicle suspension system such that a connection between the center point of the opening in the rod and a corresponding point of the vehicle suspension system is achieved;

wherein the improvement comprises an uninterrupted rotatable member which is adapted to fit with a corresponding member at said predetermined position in the vehicle suspension system;

said rotatable member being freely rotating with respect to said rod; and a polymer interface between said rotatable member and said extended rod, said polymer interface being rotatable with respect to at least one of saidd rotatable member and siad extended rod and resiliently resisting conical movement of said rotatable member with respect to said extended rod, said polymer interface having a nominal hardness greater than 71 Type A Durometer and less than 53 Type D Durometer, said hardness being chosen to allow said polymer to be compressed to absorb shock loads and to permit temporary misalignment of said rotatable member with respect to said extended rod under stress.

6. In a motor vehicle comprising a vehicle chassis, wheels, an axel for said wheels, and alignment means for alignimg said axel with respect to said chassis, the alignment means including a first part connected to one of the chassis and the axel, the first part including an opening, a second part connected to the other of the chassis and the axel, the second part extending into the opening in the first part, and an elastomeric interface between the first part and the second part, said opening, said second part, and said elastomeric interface being formed to resiliently resist conical movement of said second part with respect to said first part, the improvement wherein said elastomeric interface is a polymer rotabale with respect to at least one of said first and second parts, said polymer interface having a nominal hardness greater than 71 Type A Durometer and less than 53 Type D Durometer, said hardness being chosen to allow said polymer to be compressed to absorb shock loads and to permit temporary misalignment of said first part and said second part under stress.

7. The improvement of claim 6 wherein said elastomeric interface is fixed with respect to said part, said part having an uninterrupted ccircular outer face extending into said opening.

8. The improvement of claim 7 wherein said elastomeric interface is boned to said first part, and further including a lubricant between elastomer and said second 9. The improvement of claim 6 where said elastomeric interface is a substantially unstressed cast polyurethane.

10. The improvement of claim 6 wherein said rotatable member is an unbroken bushing ring, said elastomeric interface has nominal hardness of about 89 Type A Durometer and has a thickness at least three times the thickness of said bushing ring, and further including a pin member interference fit between saiad bushing and the vehicle assembly.

11. A bushing comprising an outer element having an opening therein defining a cylindrical inner surface, an inner element having a cylindrical outer surface, at least one of said inner surface and said outer surface being an uninterruted roundd cylindrical surface, said inner element extending into said opening in said outer element, and an elastomeric interface between said outer element and said inner element, said elastomeric interface consisting essentially of a vast polymer having a nominal hardness greater than 71 Type A Durometer and less than 53 Type D Durometer, said hardness being chosen to allow said polymer to be compressed to absorb shock loads and to permit temporary misalignment of said outer and inner element under stress, and a release coating on said round cylindrical surface, saaid round cylindrical surface being rotatable with respect to said polyurethane interface.

12. The method of forming alignment means for aligning an axel of a motor vehicle witht respect to a chassis of said motor vehicle, said alignment means including a first part connected to one of said chassis and said axel, said first part including an opening, a second part connected to the other of said chassis and said axel, saaid second part extending into said opening in said first part, and an elastomeric interface between said first part and said second part, said opening, said second part, and said elastomeric interface being formed to resiliently resist conical movement of said second part with respect to said first part, said method comprising aligning saaid first part with respect to said second part, and casting said elastomer between said first part and saiadd second part to form a rotatable joint between saiad first part and said second part, said polymer having a nominal hardness greater than 71 Type A Durometer and less than 53 Type D Durometer, said hardness being chosen to allow said polymer to be compressed to absorb shock loads and to permit temporary misalignment of said first and second parts under stress.

13. The method of claim 12 including a further step of attaching one said first part and said second part to said chassis and a step of attaching the other of said first part and said second part to said axel.

14. The method of claim 12 including a step of applying a release agent to one of said first part and said second part, and a step of applying a bonding agent to the other of said first part and said second part.

* * * * *

UNITED STATES PATENT AND TRADEMARK OFFICE
CERTIFICATE OF CORRECTION

PATENT NO. : 4,840,395
DATED : June 20, 1989
INVENTOR(S) : George Sturmon

It is certified that error appears in the above—identified patent and that said Letters Patent is hereby corrected as shown below:

Column 1, line 44, "aligining" should be ---aligning---; line 59, "DRAWINDS" should be ---DRAWINGS---; line 62, "representive" should be ---representative---; line 65, "DESCRIPTTION" should be ---DESCRIPTION---.

Column 2, line 2, "anad" should be ---and---; line 9, "boned" should be ---bonded---; line 11, "axel" should be ---axle---; line 14, "rodd" should be ---rod---; line 17, "0.0001" should be ---0.001---; line 17, "0.0003" should be ---0.003---; line 20, "conventioanl" should be ---conventional---; line 23, "maintined" should be ---maintained---; line 27, "asnd" should be ---and---; line 32, "type" should be ---types---; line 43, "tobe" should be ---to be---; line 52, "compund" should be ---Division)---; line 63, "initiial" should be ---initial---.

Column 3, lines 1-2, delete "the full uninterrupted bushing as opposed to the bus."; line 3, "uniterrupted" should be ---uninterrupted---; line 9, "installler" should be ---installer---; line 9, "holdd" should be ---hold---; line 24, "th efree" should be ---the free---; line 25, "rootate" should be ---rotate---; line 26, "suspensison" should be ---suspension---; line 36, "elaslomer" should be ---elastomer---; line 36, "having 49-53" should be ---having a 49-53---; line 61, "axel" should be ---axle---.

Column 4, line 39, "point." should be ---point---; line 42, "seoarates" should be ---separates---; line 45, "axel" should be ---axle---; line 59, "said rod" should be ---said extended rod---; line 62, "saidd" should be ---said---; line 63, "siad" should be ---said---.

UNITED STATES PATENT AND TRADEMARK OFFICE
CERTIFICATE OF CORRECTION

PATENT NO. : 4,840,395

DATED : June 20, 1989

INVENTOR(S) : George Sturmon

It is certified that error appears in the above—identified patent and that said Letters Patent is hereby corrected as shown below:

Column 5, line 6, "axel" should be ---axle---; line 7, "alignimg" should be ---aligning---; line 7, "axel" should be ---axle---; line 9, "axel" should be ---axle---; line 11, "axel" should be ---axle---; line 19, "rotabale" should be ---rotatable---; line 28, "said part" should be ---said first part---; line 28-29 "said part" should be ---said second part---; line 29, "ccircular" should be ---circular---; line 32, "boned" should be ---bonded---; line 33, "second" should be ---second part.---; line 34, "where" should be ---wherein---; line 42, "saiad" should be ---said---.

UNITED STATES PATENT AND TRADEMARK OFFICE
CERTIFICATE OF CORRECTION

PATENT NO. : 4,840,395
DATED : June 20, 1989
INVENTOR(S) : George Sturmon

It is certified that error appears in the above-identified patent and that said Letters Patent is hereby corrected as shown below:

Column 6, line 1, "uninterruted" should be ---uninterrupted---; line 1, "roundd" should be ---round---; line 5, "vast" should be ---cast---; line 10, "saaid" should be ---said---; line 15, "axel" should be ---axle---; line 15, "witht" should be ---with---; line 18, "axel" should be ---axle---; line 20, "axel" should be ---axle---; line 20, "saaid" should be ---said---; line 28, "saaid" should be ---said---; line 30, "saiadd" should be ---said---; line 31, "saiad" should be ---said---; line 40, "one said" should be ---one of said---; line 41, "axel" should be ---axle---.

Signed and Sealed this

Fourth Day of June, 1991

Attest:

HARRY F. MANBECK, JR.

*Attesting Officer*  *Commissioner of Patents and Trademarks*